US010027750B1

(12) United States Patent
Siegel (10) Patent No.: US 10,027,750 B1
(45) Date of Patent: Jul. 17, 2018

(54) UTILIZING NETWORK IDENTIFIERS THAT ARE BASED ON MEDIA ITEMS

(71) Applicant: IMDb.com, Inc., Seattle, WA (US)

(72) Inventor: Hilliard Bruce Siegel, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 140 days.

(21) Appl. No.: 15/270,303

(22) Filed: Sep. 20, 2016

Related U.S. Application Data (62) Division of application No. 14/036,045, filed on Sep. 25, 2013, now Pat. No. 9,485,307.

(51) Int. Cl.
*G06F 15/16* (2006.01)
*H04L 29/08* (2006.01)
*H04L 29/06* (2006.01)

(52) U.S. Cl.
CPC ...... *H04L 67/1095* (2013.01); *H04L 65/4076* (2013.01); *H04L 65/601* (2013.01)

(58) Field of Classification Search
CPC ..... H04L 67/26; H04L 67/18; H04M 1/72522
USPC .......................................................... 709/217
See application file for complete search history.

(56) References Cited

U.S. PATENT DOCUMENTS

| | | |
|---|---|---|
| 8,331,566 B1 | 12/2012 | Foote et al. |
| 8,667,148 B1 | 3/2014 | Turner |
| 2010/0012045 A1 | 5/2010 | Herz |
| 2013/0080590 A1 | 3/2013 | Bockus, Jr. et al. |
| 2014/0074959 A1 | 3/2014 | Alsina et al. |
| 2014/0082519 A1 | 3/2014 | Wang et al. |

OTHER PUBLICATIONS

Non-Final Office Action dated Mar. 10, 2016 (U.S. Appl. No. 14/036,045).

*Primary Examiner* — Anthony Mejia
(74) *Attorney, Agent, or Firm* — Thomas Horstemeyer, LLP (57) ABSTRACT

Disclosed are various embodiments for utilizing a network identifier that is based on a media item. A computing device receives a network identifier for a network. The computing device detects that the network identifier is based on a media item and generates a user interface having information related to the media item.

20 Claims, 6 Drawing Sheets

UTILIZING NETWORK IDENTIFIERS THAT ARE BASED ON MEDIA ITEMS

CROSS REFERENCE TO RELATED APPLICATIONS

This application is a divisional of, and claims priority to, co-pending U.S. Patent Application entitled "GENERATING NETWORK IDENTIFIERS THAT ARE BASED ON MEDIA ITEMS," filed on Sep. 25, 2013, and assigned application Ser. No. 14/036,045, which is incorporated by reference as if set forth herein in its entirety.

BACKGROUND

A computing device may process various types of media items. For example, a computing device may render data that represents a book, video, audio, an image, a document, and/or any other type of media. A media item may be stored in internal memory within the computing device or in external memory that is coupled directly to the computing device. Alternatively, the computing device may access a remote computing environment to obtain and process a media item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
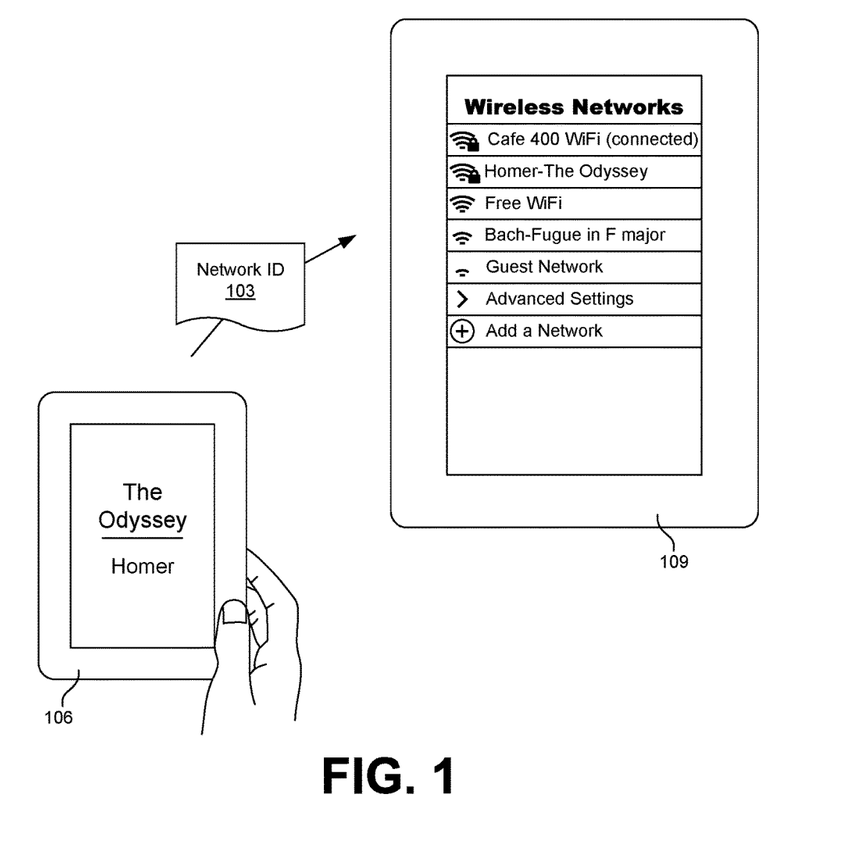
FIG. 1 is a drawing illustrating an example scenario of broadcasting a network identifier that corresponds to a media item according to various embodiments of the present disclosure.

The present disclosure relates to broadcasting a network identifier that may be based on a media item. With reference to FIG. 1, shown is a non-limiting example of a scenario in which a network identifier 103, such as a Service Set Identification (SSID) for a Wireless Local Area Network (WLAN), is based on a media item. In the scenario depicted in FIG. 1, suppose a first user is operating a first client computing device 106 to consume a media item, such as an electronic book titled "The Odyssey," by the author Homer. In accordance with various embodiments of the present disclosure, the first client computing device 106 may be configured to generate the network identifier 103 so that the network identifier 103 comprises, for example, data that identifies the title of the electronic book being rendered by the first client computing device 106.

In the example scenario depicted in FIG. 1, further assume that a second user is operating a second client computing device 109 to attempt to connect to one or more available networks. To this end, the second client computing device 109 may generate a user interface that includes a list of the network identifiers 103 of the networks that have been detected by the second client computing device 109. Because the first client computing device 106 is broadcasting the network identifier 103 that identifies the title of the electronic book, the title of the electronic book may be shown in the list of network identifiers 103 that have been detected by the second client computing device 109. Thus, the first user who operates the first client computing device 106 may broadcast the title of the electronic book that he or she is reading using the network identifier 103, and the second user who operates the second client computing device 109 may be able to view the titles or other corresponding information for media items that are being consumed in the vicinity of the second client computing device 109.

In the following discussion, a general description of the system and its components is provided, followed by a discussion of the operation of the same.

Figure 2:
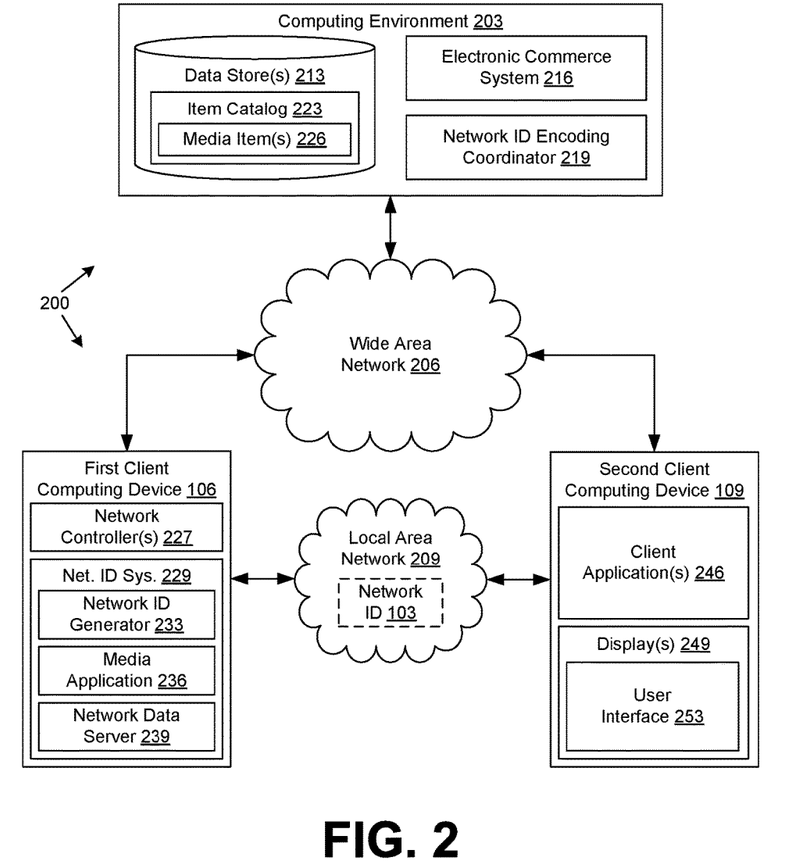
FIG. 2 is a drawing of a networked environment according to various embodiments of the present disclosure.

With reference to FIG. 2, shown is a networked environment 200 according to various embodiments. The networked environment 200 may include the first client computing device 106, the second client computing device 109, a computing environment 203, and/or potentially other devices that are in data communication with each other via a wide area network 206. The wide area network 206 may include, for example, the Internet, an intranet, an extranet, a local area network 209, a wired network, a wireless network, any other suitable network, etc., and/or any combination of two or more such networks. Such a network may comprise a satellite network, a cable network, an optical network, an Ethernet network, and/or any other suitable type of network.

The computing environment 203 may comprise, for example, a server computer or any other system providing computing capability. Alternatively, the computing environment 203 may employ multiple computing devices that may be arranged, for example, in one or more server banks or computer banks or other arrangements. Such a computing device may be located in a single installation or may be distributed among multiple geographical locations. For example, the computing environment 203 may include multiple computing devices that together comprise a hosted computing resource, a grid computing resource, and/or any other type of distributed computing arrangement. In some cases, the computing environment 203 may correspond to an elastic computing resource where the allotted capacity of processing, network, storage, or other computing-related resources may be varied over time.

Various applications and/or other functionality may be executed in the computing environment 203 according to various embodiments. Also, various data may be stored in a data store 213 that is accessible to the computing environment 203. The data store 213 may be representative of multiple data stores 213 in various embodiments. The data stored in the data store 213, for example, is associated with the operation of the various functional entities described below.

The components executed on the computing environment 203 include, for example, an electronic commerce system 216, a network identifier encoding coordinator 219, and/or other applications, services, processes, systems, engines, and/or other functional entities not discussed in detail herein. The electronic commerce system 216 may be executed to, for example, facilitate the purchase, rental, lease, trade, etc., of items over the wide area network 206. In this regard, the electronic commerce system 216 may provide an electronic marketplace where merchants, including third-party merchants, offer items for purchase, rental, lease, trade, etc.

The network identifier encoding coordinator 219 may be executed to, for example, facilitate the coding and/or decoding of network identifiers 103. In various embodiments, the network identifier encoding coordinator 219 may provide the first client computing device 106 and/or the second client computing device 109 with one or more keys so that an encoded network identifier 103 generated by the first client computing device 106 may be accurately decoded by the second client computing device 109.

The data stored in the data store 213 may include, for example, an item catalog 223 and/or other data. The item catalog 223 may comprise a listing of the items, such as the media items 226 that may be available for purchase, rental, lease, trade, etc., through the electronic commerce system 216. A media item 226 may comprise, for example, data that represents media, such as a book, audio, video, a document, and/or any other type of content. As non-limiting examples, a media item 226 may comprise an electronic book, an audio file or data stream, a video file or data stream, a multimedia file or data stream, and/or a document file or data stream. Identifying information may be associated with each media item 226. As non-limiting examples, the identifying information may comprise a title, a genre, an artist (e.g., author, composer, performer, etc.), an album name, and/or any other type of information that may be used to identify a media item 226.

The first client computing device 106 and the second client computing device 109 are representative of various types of client computing devices that may be coupled to the wide area network 206. The first client computing device 106 and/or the second client computing device 109 may each comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, and/or any other type of device with similar capabilities.

The first client computing device 106, the second client computing device 109, and/or other computing devices may be coupled together using the local area network 209. The local area network 209 may comprise, for example, a network that may connect multiple computing devices that are located within an area that is smaller than the area for the wide area network 206. As a non-limiting example, the local area network 209 may comprise an IEEE 802.11 wireless network. In various embodiments, the first client computing device 106, the second client computing device 109, and/or other computing devices may communicate together using the local area network 209.

The local area network 209 may comprise a network identifier 103. The network identifier 103 may be, for example, data that distinguishes the local area network 209 from another local area network 209. As such, the network identifier 103 may be regarded as being a "network name" for the local area network 209. In various embodiments, the network identifier 103 may comprise an alpha-numeric character string that may be readable by a human. The network identifier 103 may comprise an SSID, for example, in embodiments in which the local area network 209 comprises an IEEE 802.11 wireless network. Additionally, the network identifier 103 may be encoded in various embodiments so that the network identifier 103 indicates that the network identifier 103 corresponds to a media item 226.

The first client computing device 106 in various embodiments may comprise, for example, a network controller 227 and a network identifier system 229 that facilitates the generation and broadcasting of one or more network identifiers 103. The network controller 227 may also facilitate and control the operation of the local area network 209. For example, the network controller 227 may be configured so that the first client computing device 106 functions as an access point for the second client computing device 109 and/or other devices to access the wide area network 206. Additionally or alternatively, the network controller 227 may facilitate the first client computing device 106 transmitting and/or receiving data over the local area network 209 and/or the wide area network 206.

In various embodiments, the network controller 227 may comprise a Network Interface Controller (NIC) and/or a network adapter to facilitate access to and communication with the local area network 209 and/or the wide area network 206. Additionally, the first client computing device 106 may comprise multiple network controllers 227. For example, one network controller 227 may be used for communicating with the wide area network 206, and another network controller 227 may be used for communicating with the local area network 209. In some embodiments, one or more of the network controllers 227 may be capable of broadcasting a network identifier 103 while not being able to establish a local area network 209.

The network identifier system 229 may include, for example, a network identifier generator 233, a media application 236, a network data server 239, and/or other components. The network identifier generator 233 may be executed to, for example, generate data for the network identifier 103. As a non-limiting example, the network identifier generator 233 may generate a network identifier 103 that is based on one or more media items 226. In some embodiments, the network identifier generator 233 may communicate with the network identifier encoding coordinator 219 to generate an encoded network identifier 103.

The media application 236 may be executed to, for example, process one or more media items 226. For example, the media application 236 may render a media item 226 so that media item 226 may be experienced by a user. As a non-limiting example, the media application 236 may comprise a media player that outputs audio and/or video to a speaker and/or a display device. As another non-limiting example, the media application 236 may comprise an electronic book application that renders pages of an electronic book on a display device.

The network data server 239 may be executed to, for example, generate and/or serve network data. The network data may be transmitted to the second client computing device 109 and/or to other devices using the local area network 209. Such network data may be, for example, network pages, such as web pages, or network content embodied in some of form. In some embodiments, the network data server 239 may serve media items 226 to other client devices, such as the second client computing device 109. The network data server 239 may transmit the network data using a protocol, such as hypertext transfer protocol (HTTP), simple object access protocol (SOAP), and/or other protocols through the local area network 209 and/or the wide area network 206.

The second client computing device 109 may comprise, for example, a client application 246, a display 249, and/or other components. The client application 246 may be executed to, for example, receive and process data associated with one or more network identifiers 103. For example, the client application 246 may be configured to detect whether a network identifier 103 that has been received is based on a media item 226. Furthermore, the client application 246 may be configured to generate lists of one or more network identifiers 103 that have been received by the second client computing device 109. In some embodiments, the client application 246 may filter the lists responsive to, for example, whether the respective network identifiers 103 are based on a media item 226.

Additionally, the client application 246 may be configured to access and render network data from the network data server 239 and/or other data. As previously discussed, the network data from the network data server 239 may be embodied in the form of a network page, such as a web page, or other network content. As such, the client application 246 may be embodied in the form of a network page browser, such as a web browser. In other embodiments, the client application 246 may be embodied in the form of a dedicated application that, for example, processes the media items 226, information related to the media items 226, information related to the network identifier 103, and/or performs other functionality.

The second client computing device 109 may include a display 249. The display 249 may comprise, for example, a liquid crystal display (LCD), a gas plasma-based flat panel display, an organic light emitting diode (OLED) display, an electrophoretic ink (E ink) display, an LCD projector, and/or any other type of display device. The display 249 may render user interface 253. The user interface 253 may comprise, for example, renderings of various data. Additionally, the user interface 253 may facilitate the user control and operation of the second client computing device 109.

Next, a general description of the operation of the various components of the networked environment 200 is provided. In the following discussion, it is assumed that the first client computing device 106 has obtained a media item 226 from the computing environment 203. For example, the first client computing device 106 may have been used to purchase a media item 226 via the electronic commerce system 216, and the computing environment 203 may have transmitted the media item 226 to the first client computing device 106. Thereafter, the media item 226 may be stored in internal memory in the first client computing device 106 to be processed at a later time. Alternatively, the computing environment 203 may stream the media item 226 to the first client computing device 106 on demand from the first client computing device 106. In addition, it is assumed that the user of the first client computing device 106 has configured the privacy settings of the first client computing device 106 so that a network identifier 103 may be generated and broadcast based on a media item 226.

After the first client computing device 106 has obtained at least a portion of the media item 226, the media application 236 may begin to process the media item 226. For example, if the media item 226 comprises audio and/or video, the media application 236 may decode the media item 226 and output the audio and/or video using a display device and/or speakers. As another example, if the media item 226 is an electronic book, the media application 236 may decode and render one or more pages of the electronic book.

The network identifier generator 233 may then obtain various information associated with the media item 226 that is being processed or that has been previously processed. For example, if the media item 226 comprises a musical composition, the network identifier generator 233 may obtain the title, composer, performer, genre, album, playlist, etc., that corresponds to the musical composition. As another example, if the media item 226 comprises an electronic book, the network identifier generator 233 may obtain the title, author, genre, etc., that corresponds to the electronic book. In some embodiments, such information may be stored in conjunction with the media item 226, for example, as metadata. In alternative embodiments, the network identifier generator 233 may use an identifier for the media item 226 to obtain information from the electronic commerce system 216. For example, the title of the electronic book may be used to obtain information regarding the author, genre, related authors, and/or other related information for the media item 226.

The network identifier generator 233 may then generate a network identifier 103 that corresponds to the information associated with the media item 226. For example, if the media item 226 comprises music, the network identifier generator 233 may generate the network identifier 103 so that the network identifier 103 represents the title, author, genre, album, etc., that corresponds to the media item 226. As another example, if the media item 226 comprises an electronic book, the network identifier generator 233 may generate the network identifier 103 so that the network identifier 103 represents the title, author, genre, etc., that corresponds to the media item 226. Thus, in various embodiments, the network identifier 103 may be generated that identifies the media item 226, an artist associated with the media item 226, a category for the media item 226, a playlist in which the media item 226 is listed, and/or any other information corresponding to the media item 226.

In some embodiments, the network identifier 103 may represent an audience suitability rating that is associated with the media item 226 that is being processed. The audience suitability rating may be, for example, a rating that indicates a suitable age for the audience that may consume the media item 226. For instance, the audience suitability rating for a media item 226 that is a movie may be the rating that the Motion Picture Association of America (MPAA) has assigned to the movie. As a non-limiting example, such a network identifier 103 may be the string "Sunny Seattle—Rated PG-13," indicating that the movie titled "Sunny Seattle" is being processed in the first client computing device 106 and that the movie has been rated PG-13 by the MPAA. Similarly, an audience suitability rating for a media item 226 that is a musical composition may indicate whether a Parental Advisory Label (PAL) has been assigned to the musical composition by the Recording Industry Association of America (RIAA). As a non-limiting example, such a network identifier 103 may be "Bach—Fugue in F major (remix)—Parental Advisory: Explicit Content."

The data generated by the network identifier generator 233 may be provided to the network controller 227, and the network controller 227 may initialize the local area network 209. To this end, the network controller 227 may be powered up and configured to operate in a desired mode. For instance, the network controller 227 may be configured to operate in an access point mode or any other type of suitable configuration.

Additionally, the network controller 227 may determine whether to implement an encryption protocol for the local area network 209. If so, an encryption key may be required for the second client computing device 109 or potentially other computing devices to join the local area network 209 that is established by the first client computing device 106.

The network controller 227 may then broadcast the network identifier 103 that is based on the media item 226 that was or is being processed by the media application 236. Thus, the second client computing device 109 and potentially other computing devices may receive the network identifier 103 that corresponds to the media item 226. Additionally, from time to time, the network identifier generator 233 and/or the network controller 227 may update the network identifier 103 that is being broadcast. For instance, the network identifier 103 that is broadcast may be updated upon a subsequent media item 226 being processed. In other embodiments, the network identifier 103 that is broadcast may be updated periodically.

According to various embodiments, the decision on whether the network identifier 103 is to be broadcast may be based on one or more settings for the network identifier system 229. For example, a user may specify privacy settings that enable or disable the broadcasting of the network identifier 103. Additionally, or alternatively, whether the network identifier 103 is broadcast may be determined based on various types of criteria. As a non-limiting example, the network identifier system 229 may determine whether to broadcast the network identifier 103 based on the location of the first client computing device 106.

In some embodiments, the network identifier 103 may be encoded to facilitate the second client computing device 109 and/or other computing devices detecting that the network identifier 103 is based on a media item 226. To this end, a portion of the network identifier 103 may indicate that the network identifier 103 is based on a media item 226. Additionally, the network identifier 103 may include a type code to indicate the type of the media item 226 that is being or that has been processed by the first client computing device 106. As a non-limiting example, suppose a network identifier 103 is generated that represents the string "*BK*Homer-The Odyssey." The "*BK*" segment of the network identifier 103 is a type code that indicates that the network identifier 103 corresponds to a media item 226, namely an electronic book. Additionally, the "Homer-The Odyssey" segment of the network identifier 103 identifies the media item 226 that is being or that has been processed by the first client computing device 106. In this way, the client application 246 may detect whether a received network identifier 103 indicates that the network identifier 103 is based on a media item 226 and the particular type of the media item 226 that is identified.

Additionally, the second client computing device 109 may generate one or more lists of the network identifiers 103 responsive to whether the respective network identifiers 103 are based on corresponding media items 226. For instance, a first list may be generated that includes the network identifiers 103 that have been received and that are not based on a media item 226. Additionally, a second list may be generated that includes the network identifiers 103 that are based on corresponding media items 226 and that excludes the network identifiers 103 that are not based on corresponding media items 226. The client application 246 may also generate one or more user interfaces 253 that represent these lists. For instance, a first user interface 253 may include a rendering of a list of one or more network identifiers 103 that are not based on a media item 226, and a second user interface 253 may include a rendering of at least some of the media items 226 that are being processed within the vicinity of the second client computing device 109.

In various embodiments, the network identifier encoding coordinator 219 may transmit one or more keys to the first client computing device 106 and/or the second client computing device 109 to coordinate the encoding of the network identifier 103. For example, from time to time, the network identifier encoding coordinator 219 may transmit a key to the first client computing device 106 and to the second client computing device 109. The network identifier generator 233 may use the received key to generate at least the portion of the network identifier 103. The client application 246 may decode a received network identifier 103 using the key received from the network identifier encoding coordinator 219. Thereafter, the client application 246 may detect whether the decoded network identifier 103 indicates that the network identifier 103 is based on a media item 226. In this way, the client application 246 may avoid detecting a network identifier 103 that falsely indicates that the network identifier 103 based on a media item 226.

In some embodiments, the network controller 227 may restrict other computing devices, such as the second client computing device 109, from joining the local area network 209 and/or accessing the first client computing device 106. To this end, the network controller 227 may implement an encryption protocol for the local area network 209, and the encryption key for the local area network 209 may be unknown to the user of the first client computing device 106 and/or the user of the second client computing device 109. Alternatively, the network controller 227 may broadcast a network identifier 103 without establishing a local area network 209. In such embodiments, the second client computing device 109 may receive the network identifier 103, but there would be no corresponding local area network 209 for the second client computing device 109 to join.

In alternative embodiments, the network controller 227 may facilitate other computing devices, such as the second client computing device 109, joining the local area network 209 and/or accessing the first client computing device 106. To this end, various embodiments of the network controller 227 may establish the local area network 209 so that it does not require an encryption key, or an encryption key for the local area network 209 may be provided to the second client computing device 109.

The network identifier system 229 in various embodiments may generate network data that is served by the network data server 239 to the second client computing device 109 via the local area network 209. In some embodiments, network data, such as a network page, may be encoded that includes information related to one or more media items 226 that have been processed or that are accessible to the first client computing device 106. For example, such a network page may include a representation of a media library that is available to the first client computing device 106. As another non-limiting example, a network page may be encoded that provides information related to the title, artist, author, genre, lyrics, etc., for the media item 226. The second client computing device 109 may access the first client computing device 106 using the client application 246 and obtain the one or more network pages from the network data server 239 via the local area network 209. Thereafter, the client application 246 may decode and render the one or more network pages.

In some embodiments, the network identifier system 229 may provide a copy of the media item 226 that corresponds to the network identifier 103 to the second client computing device 109 via the local area network 209. To this end, the second client computing device 109 may use the client application 246 to access the network identifier system 229 and obtain, decode, and render the copy of the media item 226. In alternative embodiments, the network identifier system 229 may provide data, such as a hyperlink, that facilitates the second client computing device 109 obtaining a copy of the media item 226 and/or related information from the electronic commerce system 216 and/or from another computing device.

Providing a copy of at least a portion of a media item 226 may require the payment of a royalty. As such, an entity may contribute towards the royalty payment by engaging in a sponsorship. For example, the operator of the first client computing device 106, the operator of the computing environment 203, a business located where the local area network 209 is being provided, and/or any other entity may sponsor the copying of at least a portion of the media item 226. In such cases, the client application 246 may generate a user interface 253 that that identifies or advertises the entity that sponsors the copying of the media item 226.

It may be the case that the local area network 209 becomes unusable for the second client computing device 109 upon the network identifier 103 being changed, for example, in response to a subsequent media item 226 being processed. As such, the first client computing device 106 may be restricted from changing the network identifier 103 if the second client computing device 109 is a member of the local area network 209 and/or if the first client computing device 109 is obtaining data through the local area network 209. Alternatively, the second client computing device 109 may obtain a copy of the media item 226 and/or other network data from the first client device 106 and/or the computing environment 203 through the wide area network 206. In this way, the network identifier 103 can be updated while the second client computing device 109 obtains network data that corresponds to the media item 226.

In some embodiments, a portion of the media item 226 may be copied and transmitted by the network identifier system 229 to the second client computing device 109. For example, if the media item 226 comprises audio, a sample of the audio may be copied and transmitted to the second client computing device 109. As another non-limiting example, if the media item 226 comprises an electronic book, a selected chapter, a selected page, or any other predetermined portion of the electronic book may be copied and transmitted to the second client computing device 109. The selected page and/or chapter of the electronic book may be the same page and/or chapter that is currently being processed by the first client computing device 106, and the shared portion of the media item 226 may be updated as the first client computing device 106 progresses through the electronic book. Thus, the user of the second client computing device 109 may be able to sample at least a portion of the media item 226 that is being processed by the first client computing device 106.

For some embodiments, the client application 246 may be restricted from processing the copy of the media item 226 after a predefined event. As non-limiting examples, the event may be the expiration of a timer or the second client computing device 109 being disconnected from the local area network 209 that corresponds to the network identifier 103. As another example, the event that triggers restricting the processing of the media item 226 may be the first client computing device 106 and/or the second client computing device 109 being moved a predetermined distance away from a starting point. For example, the client application 246 may use geographical data obtained from a Global Positioning System (GPS) device, cellular telephone network, indoor positioning system, and/or any other positioning system to determine whether the second client computing device 109 has been moved a predetermined distance from a starting point. Such a starting point may be, for example, the location of the first client computing device 106 or the location where the second client computing device 109 was located when the second client computing device 109 joined the local area network 209 and/or received the copy of the media item 226. Thus, in some embodiments, a user of the second client computing device 109 may render copies of the media items 226 that are available to the first client computing device 106 until the occurrence of a predetermined event.

Figure 3:
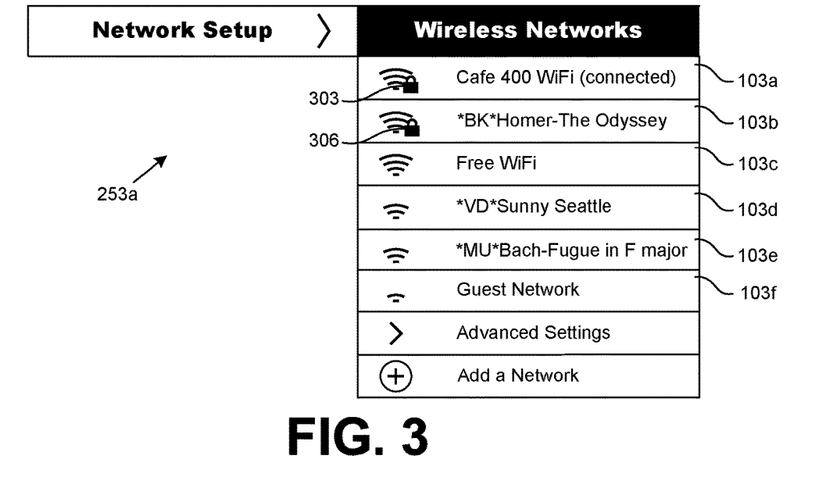
FIGS. 3-5 are pictorial diagrams of examples user interfaces rendered by a client computing device in the networked environment of FIG. 2 according to various embodiments of the present disclosure.

With reference to FIG. 3, shown is a pictorial diagram of an example of a user interface 253, referred to herein as the user interface 253a, that may be encoded by the client application 246 (FIG. 2) and rendered by the display 249 (FIG. 2). For the non-limiting example shown in FIG. 3, several network identifiers 103, referred to herein as the network identifiers 103a-103f, have been received by the second client computing device 109.

The user interface 253a shown includes a list of the network identifiers 103a-103f that have been received by the client application 246. With respect to the network identifier 103b, the string "*BK*" indicates that the network identifier 103b is based on an electronic book, and the string "Homer-The Odyssey" represents the author and title of the book. The string "*VD*" for the network identifier 103d indicates that the network identifier 103d is based on a video, and the string "Sunny Seattle" represents the title of the video. With respect to the network identifier 103e, the string "*MU*" indicates that the network identifier 103e is based on a musical composition, and the string "Bach-Fugue in F major" represents the composer and title of the musical composition.

The user interface 253 also includes a first encryption indicator 303 and a second encryption indicator 306. The first encryption indicator 303 and the second encryption indicator 306 indicate that the respective local area networks 209 (FIG. 2) that corresponding to the network identifiers 103a-103b employ encryption protocols. As such, a respective encryption key may be required for the second client computing device 109 to participate in the local area networks 209 that correspond to the network identifiers 103a-103b.

Figure 4:
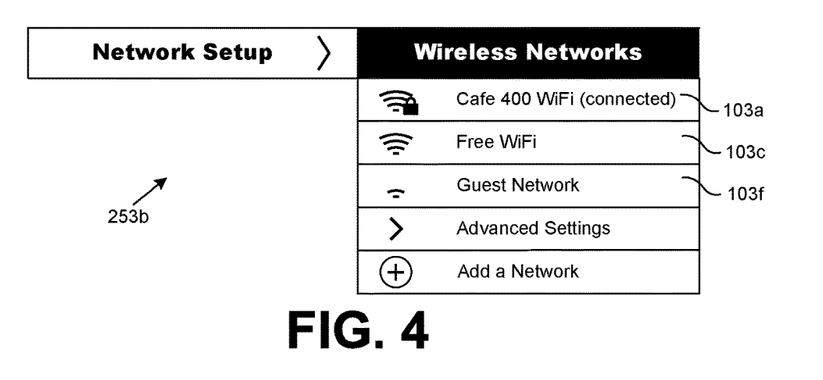

With reference to FIG. 4, shown is a pictorial diagram of an example of a user interface 253, referred to herein as the user interface 253b, that may be encoded by the client application 246 (FIG. 2) and rendered by the display 249 (FIG. 2). The user interface 253b is similar to the user interface 253a (FIG. 4). However, in the example for FIG. 4, the network identifiers 103b, 103d, and 103e (FIG. 3) that have been detected as being based on media items 226 (FIG. 2) are excluded from the list of the network identifiers 103a, 103c, and 103f. Such a list that is shown in FIG. 4 may be desirable, for example, when the second client computing device 109 is being operated in an environment, such as an airport, where there may be a large quantity of devices that are broadcasting network identifiers 103 based on media items 226.

The user interface 253b may facilitate a user causing the second client computing device 109 to join one or more of the local area networks 209 that correspond to the network identifiers 103a, 103c, and 103f that are represented in the user interface 253b. For example, a user can select the region labeled "Free WiFi," and the second client computing device 109 may initiate the process of joining the local area network 209 that corresponds to the network identifier 103a.

Figure 5:
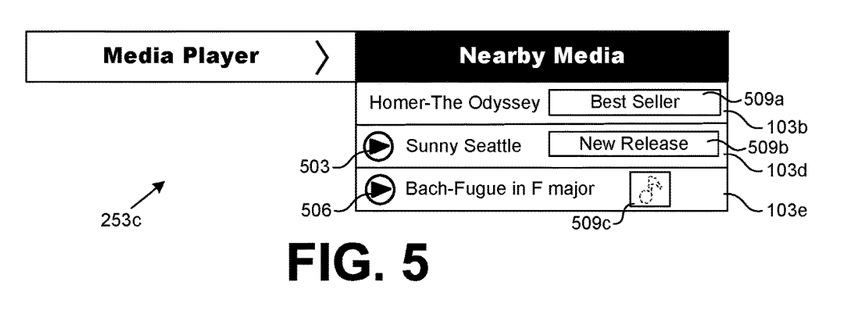

With reference to FIG. 5, shown is a pictorial diagram of an example of a user interface 253, referred to herein as the user interface 253c, that may be encoded by the client application 246 (FIG. 2) and rendered by the display 249 (FIG. 2). The user interface 253c is similar to the user interface 253a (FIG. 4). However, in the example for FIG. 5, the network identifiers 103b, 103d, and 103e (FIG. 3) that have been detected as being based on respective media items 226 are represented in the user interface 253c. Additionally, the network identifiers 103a, 103c, and 103f (FIG. 3) are not represented in the user interface 253c.

The user interface 253c also includes a first render button 503 and a second render button 506. Upon the first render button 503 being selected, the client application 246 may obtain and playback a copy of at least a portion of the corresponding media item 226 upon which the network identifier 103d is based. The copy of the media item 226 may be obtained from the first client computing device 106 and/or the computing environment 203 through the wide area network 206 and/or the local area network 209. Similarly, upon the second render button 506 being selected, the client application 246 may obtain and playback at least a portion of a copy of the corresponding media item 226 upon which the network identifier 103e is based.

Additionally, the user interface 253c shown in FIG. 5 includes regions 509a-509c that provide information related to the network identifiers 103b, 103d, and 103e that are based on respective media items 226. The information that is provided in the regions 509a-509c may be obtained from, for example, the electronic commerce system 216. In the example shown in FIG. 5, the region 509a indicates that the media item 226 for the network identifier 103b is on a list for best-selling electronic books. The region 509b in the example shown in FIG. 5 indicates that the media item 226 for the network identifier 103d is a newly released movie. Additionally, the region 509c provides a rendering of the album art for the media item 226 for the network identifier 103e.

Figure 6:
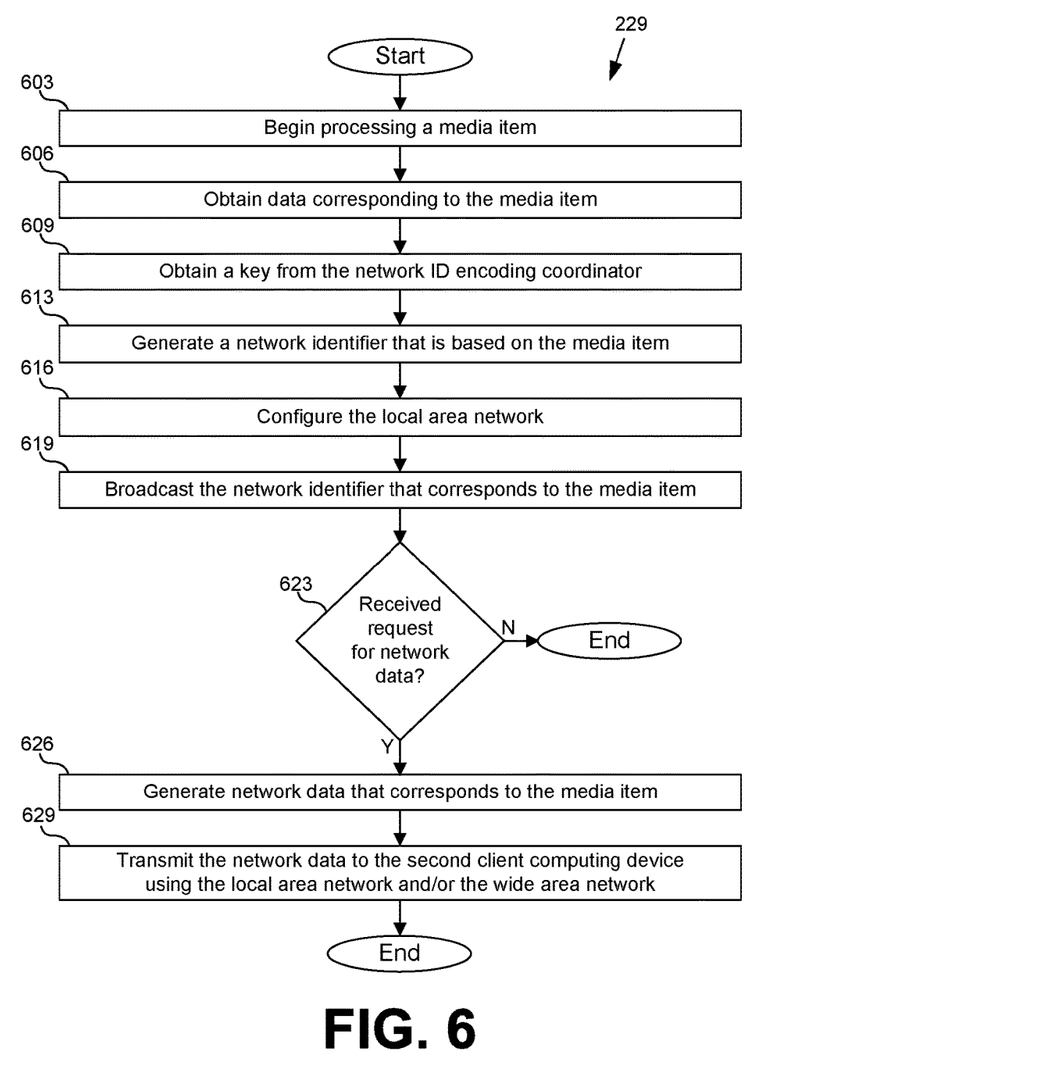
FIG. 6 is a flowchart illustrating an example of portions of functionality implemented by a network identifier system in the networked environment of FIG. 2 according to various embodiments of the present disclosure.

With reference to FIG. 6, shown is a flowchart that provides an example of a portion of the operation of the network identifier system 229 according to various embodiments. In particular, the flowchart of FIG. 6 represents an example of the network identifier system 229 generating and broadcasting a network identifier 103 (FIG. 2) based on a media item 226 (FIG. 2). It is understood that the flowchart of FIG. 6 provides merely an example of the many different types of functional arrangements that may be employed to implement the portion of the operation of the network identifier system 229 as described herein. As an alternative, the flowchart of FIG. 6 may be viewed as depicting an example of elements of a method implemented in the first client computing device 106 (FIG. 2) according to one or more embodiments.

Beginning with block 603, the network identifier system 229 begins processing the media item 226. For example, the media application 236 (FIG. 2) may output audio, output video, render one or more pages of an electronic book, and/or perform any other type of processing function. At block 606, the network identifier system 229 obtains data for the media item 226 that is being or that has been processed. Such data may include, for example, a title, an artist name, a composer name, a genre, a page number, a track number, an album title, and/or any other type of information that corresponds to the media item 226.

The network identifier system 229 then moves to block 609 and obtains a key from the network identifier encoding coordinator 219. As discussed above, the key may be used to encode the network identifier 103. The network identifier generator 233 then generates a network identifier 103 that is based on the media item 226, as shown at block 613. The key obtained at block 609 and the data obtained from 606 may be used to generate the network identifier 103 that is based on the media item 226. Thus, in various embodiments, the network identifier 103 may or may not be encoded in accordance with the key.

As indicated at block 616, the network identifier system 229 then configures the local area network 209 that corresponds to the network identifier 103 that has been generated. For example, network identifier system 229 may determine various configuration parameters for the local area network 209. For instance, network identifier system 229 may determine whether an encryption protocol is to be used and/or whether the network controller 227 is to operate in an access point mode. The network identifier system 229 then broadcasts the network identifier 103, as shown at block 619. To this end, the network identifier 103 may be provided to the network controller 227, and the network controller 227 may transmit the network identifier 103. Thus, the network identifier system 229 may broadcast a network identifier 103 that is based on a media item 226.

At block 623, the network identifier system 229 determines whether the second client computing device 109 has requested network data from the first client computing device 106 (FIG. 2). If not, the process ends.

If the second client computing device 109 has requested network data, the network identifier system 229 may generate various types of network data, as indicated at block 626. For example, one or more network pages may be generated that include information related to the media item 226. For instance, the network page may include a description of the media item 226, the corresponding author or artist, any/or any other information relevant to the media item 226. Additionally or alternatively, one or more network pages may be generated that include a listing of a media library that is accessible to the first client computing device 106. In some embodiments, the network data that is generated may be a copy of at least a portion of the media item 226 that corresponds to the network identifier 103. For instance, the page of an electronic book being processed by the first client computing device 106 may be copied. In alternative embodiments, a predetermined amount of a musical composition or video, for example, that is being processed by the first client computing device 106 may be copied.

As shown at block 629, the network data that was generated is then transmitted to the second client computing device 109 via the local area network 209 and/or the wide area network 206 (FIG. 2). Thereafter, the process ends.

Figure 7:
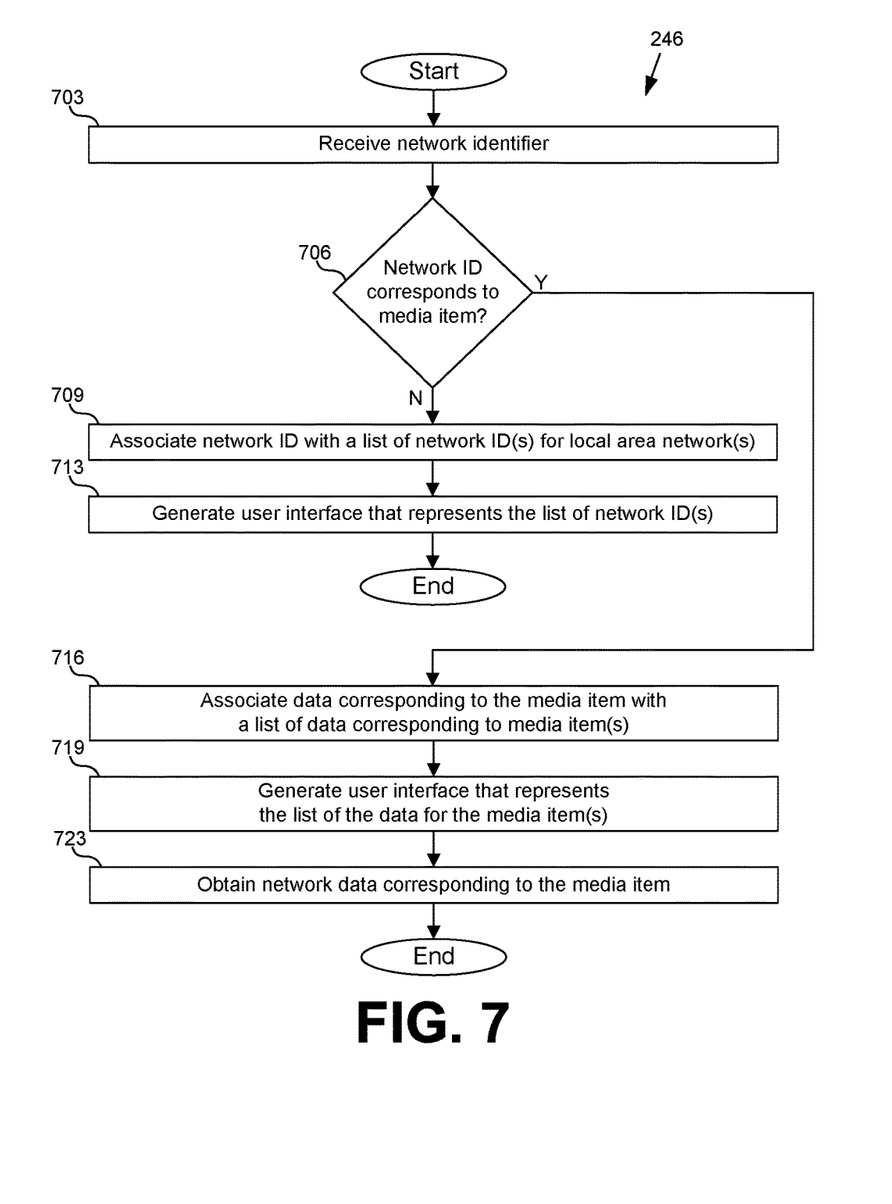
FIG. 7 is a flowchart illustrating an example of portions of functionality implemented by a client application in the networked environment of FIG. 2 according to various embodiments of the present disclosure.

With reference to FIG. 7, shown is a flowchart that provides an example of a portion of the operation of the client application 246 according to various embodiments. In particular, the flowchart of FIG. 7 represents an example of the client application 246 receiving a network identifier 103 and representing the network identifier 103 in a user interface 253. It is understood that the flowchart of FIG. 7 provides merely an example of the many different types of functional arrangements that may be employed to implement the portion of the operation of the client application 246 as described herein. As an alternative, the flowchart of FIG. 7 may be viewed as depicting an example of elements of a method implemented in the second client computing device 109 (FIG. 2) according to one or more embodiments.

Beginning at block 703, the client application 246 receives a network identifier 103. The network identifier 103 may have been broadcast, for example, by the first client computing device 106 (FIG. 2). In some embodiments, the client application 246 may receive a key from the network identifier encoding coordinator 219 and use the key to decode the network identifier 103.

At block 706, the client application 246 determines whether the network identifier 103 corresponds to a media item 226. To this end, the client application 246 may determine whether a segment of the received network identifier 103 matches a type code. If the network identifier 103 does not correspond to a media item 226, the client application 246 moves to block 709 and associates the received network identifier 103 with a list of one or more other network identifiers 103 for one or more other local area networks 209. Thereafter, the client application 246 generates a user interface 253 (FIG. 2) that represents the list of the network identifiers 103 for the local area networks 209, as shown at block 713. Thereafter the process ends.

If, at block 706, the network identifier 103 does correspond to a media item 226, the client application 246 moves to block 716 and associates data corresponding to the media item 226 with a list of other data corresponding to one or more other media items 226. For example, the list may include the titles, authors, performers, artists, genres, etc., associated with the media items 226.

The client application 246 then moves to block 719 and generates a user interface 253 that represents the list of the data for the media items 226. As shown in block 723, the client application 246 may also obtain network data related to the media item 226 that corresponds to the network identifier 103. For example, the client application 246 may obtain a network page and/or a copy of at least a portion of the media item 226 from the first client computing device 106 through the local area network 209. Alternatively, the network data may be obtained from the first client computing device 106 or the computing environment 203 through the wide area network 206. Thereafter, the process ends.

Figure 8:
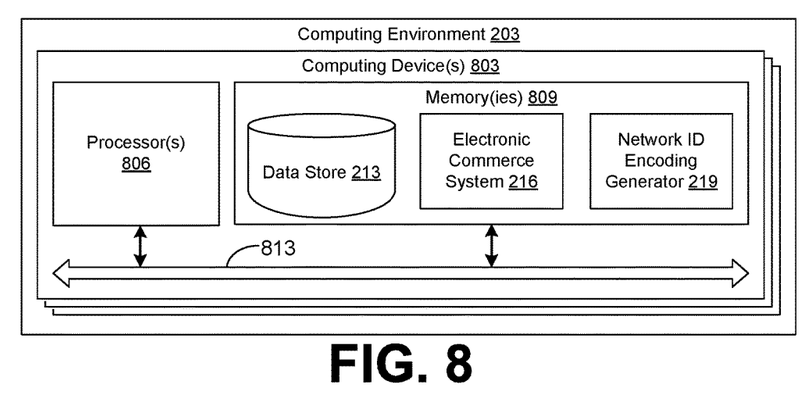
FIG. 8 is a schematic block diagram that provides an example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 803. Each computing device 803 includes at least one processor circuit, for example, having a processor 806 and a memory 809, both of which are coupled to a local interface 813. As such, each computing device 803 may comprise, for example, at least one server computer or like device. The local interface 813 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are the electronic commerce system 216, the network identifier encoding coordinator 219, and potentially other applications. Also stored in the memory 809 may be the data store 213 and other data. In addition, an operating system may be stored in the memory 809 and executable by the processor 806.

Figure 9:
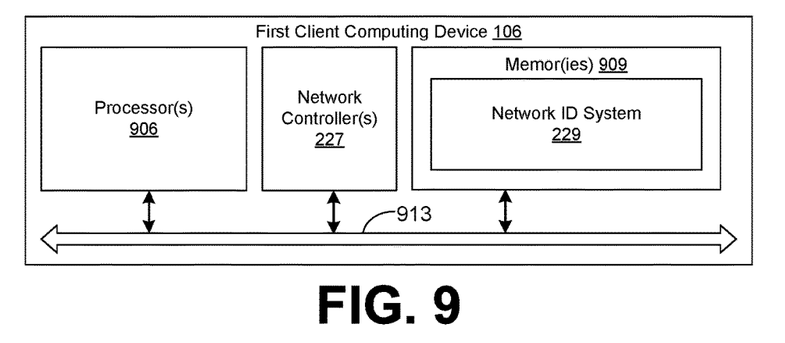
FIG. 9 is a schematic block diagram that provides an example illustration of a first client computing device employed in the networked environment of FIG. 2 according to various embodiments of the present disclosure.

With reference to FIG. 9, shown is a schematic block diagram of the first client computing device 106 according to an embodiment of the present disclosure. The first client computing device 106 includes at least one processor circuit, for example, having a processor 906 and a memory 909, both of which are coupled to a local interface 913. The network controller 227 is also coupled to the local interface 913. The local interface 913 may comprise, for example, a data bus with an accompanying address/control bus or other bus structure as can be appreciated.

Stored in the memory 909 are both data and several components that are executable by the processor 906. In particular, stored in the memory 909 and executable by the processor 906 is the network identifier system 229 and potentially other applications. In addition, an operating system may be stored in the memory 909 and executable by the processor 906.

Figure 10:
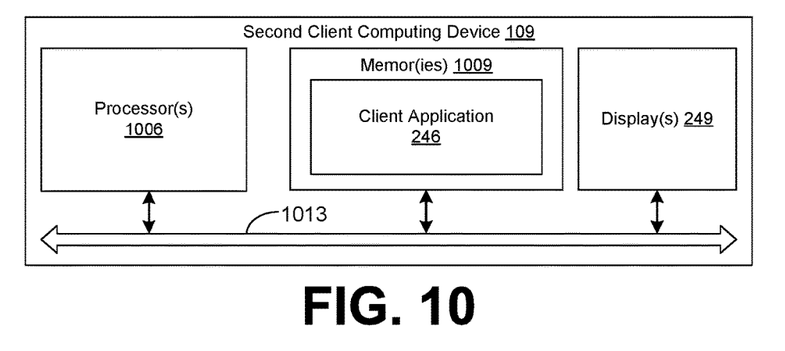
FIG. 10 is a schematic block diagram that provides an example illustration of a second client computing device employed in the networked environment of FIG. 2 according to various embodiments of the present disclosure.

With reference to FIG. 10, shown is a schematic block diagram of the second client computing device 109 according to an embodiment of the present disclosure. The second client computing device 109 includes at least one processor circuit, for example, having a processor 1006 and a memory 1009, both of which are coupled to a local interface 1013. The display 249 is also coupled to the local interface 1013. The local interface 1013 may comprise, for example, a data bus with an accompanying address/control bus or other bus structure as can be appreciated.

Stored in the memory 1009 are both data and several components that are executable by the processor 1006. In particular, stored in the memory 1009 and executable by the processor 1006 is the client application 246 and potentially other applications. In addition, an operating system may be stored in the memory 1009 and executable by the processor 1006.

It is understood that there may be other applications that are stored in the memories 809, 909, and 1009 and are executable by the respective processors 806, 906, 1006. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 809, 909, 1009 and are executable by the respective processors 806, 906, 1006. In this respect, the term "executable" means a program file that is in a form that can ultimately be run by one or more of the processors 806, 906, and 1006. Examples of executable programs may be, for example, a compiled program that can be translated into machine code in a format that can be loaded into a random access portion of one or more of the memories 809, 909, and 1009 and run by the respective processors 806, 906, 1006; source code that may be expressed in proper format, such as object code that is capable of being loaded into a random access portion of one or more of the memories 809, 909, and 1009, and executed by the respective processors 806, 906, 1006; or source code that may be interpreted by another executable program to generate instructions in a random access portion of one or more of the memories 809, 909, and 1009 to be executed by the respective processors 806, 906, and 1006, etc. An executable program may be stored in any portion or component of one or more of the memories 809, 909, 1009, including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 809, 909, and 1009 is defined herein as including both volatile and nonvolatile memory and data storage components. Volatile components are those that do not retain data values upon loss of power. Nonvolatile components are those that retain data upon a loss of power. Thus, each of the memories 809, 909, and 1009 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 806, 906, and 1006 may represent multiple processors 806, 906, and 1006 and/or multiple processor cores. Additionally, each of the memories 809, 909, and 1009 may represent multiple memories 809, 909, and 1009 that operate in parallel processing circuits, respectively. In such a case, the local interfaces 813, 913, and 1013 may be appropriate networks that facilitate communication between any of the respective processors 806, 906, and 1006, between any respective processor 806, 906, and 1006 and any of the respective memories 809, 909, and 1009, or between any of the respective memories 809, 909, and 1009, etc. The respective local interfaces 813, 913, and 1013 may comprise additional systems designed to coordinate this communication, including, for example, performing load balancing. The processors 806, 906, and 1006 may be of electrical or of some other available construction.

Although the network identifier system 229, the client application 246, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the network identifier system 229 and the client application 246, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a respective processor 906 and 1006 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including network identifier system 229 and the client application 246, that comprises software or code can be embodied in any non-transitory computer-readable medium for use by or in connection with an instruction execution system such as, for example, a respective one of the processors 806, 906, and 1006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network identifier system 229 and the client application 246, may be implemented and structured in a variety of ways. For example, one or more applications described may be implemented as modules or components of a single application. Further, one or more applications described herein may be executed in shared or separate computing systems or a combination thereof. For example, a plurality of the applications described herein may execute in the same computing device 803 or in multiple computing devices 803 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory;
    an application comprising machine readable instructions stored in the memory that, when executed by the processor, cause the computing device to at least:
        detect a local area network having a network identifier, the local area network being broadcast using another computing device;
        determine that the network identifier corresponds to a media item;
        associate the media item with a plurality of media items, each of the media items corresponding to a respective network identifier; and
        generate a user interface comprising a list of the plurality of media items.

2. The system of claim 1, wherein when executed by the processor, the machine readable instructions further cause the computing device to at least identify a first segment and a second segment of the network identifier to determine that the network identifier corresponds to the media item, where the first segment indicates that the network identifier corresponds to a particular type of the media item and the second segment represents a title of the media item.

3. The system of claim 1, wherein when executed by the processor, the machine readable instructions further cause the computing device to at least decode the network identifier.

4. The system of claim 1, wherein when executed by the processor, the machine readable instructions further cause the computing device to at least receive data corresponding to the media item via at least one of the local area network or a wide area network.

5. A system, comprising:
    a computing device comprising a processor and a memory;
    an application comprising machine readable instructions stored in the memory that, when executed by the processor, cause the computing device to at least:
        detect a wireless network identifier using the computing device;
        determine that the wireless network identifier corresponds to a media item; and
        generate a user interface comprising an indication that the media item is detected when the wireless network identifier corresponds to the media item.

6. The system of claim 5, wherein when executed by the processor, the machine readable instructions further cause the computing device to at least:
    generate the user interface further comprising a button that initiates playback of at least a portion of the media item;
    obtain at least a portion of the media item via a network in response to a user selection of the button; and
    playback at least the portion of the media item.

7. The system of claim 5, wherein when executed by the processor, the machine readable instructions further cause the computing device to at least:
    obtain information related to the media item via a network; and
    include the information in the user interface.

8. The system of claim 5, wherein the user interface facilitates a purchase of the media item via a network and wherein when executed by the processor, the machine readable instructions further cause the computing device to at least download the media item via the network.

9. The system of claim 5, wherein when executed by the processor, the machine readable instructions further cause the computing device to at least obtain at least a portion of the media item.

10. The system of claim 5, wherein when executed by the processor, the machine readable instructions further cause the computing device to at least connect to a network associated with the wireless network identifier.

11. The system of claim 5, wherein when executed by the processor, the machine readable instructions further cause the computing device to at least determine a type of the media item based at least in part on a predetermined type code in the wireless network identifier.

12. The system of claim 11, wherein when executed by the processor, the machine readable instructions further cause the computing device to at least indicate the type of the media item in the user interface.

13. The system of claim 5, wherein when executed by the processor, the machine readable instructions further cause the computing device to at least exclude a wireless network associated with the wireless network identifier from a list of available networks in response to determining that the wireless network identifier corresponds to the media item.

14. A method, comprising:
    receiving, using a computing device, a network identifier being broadcast using another computing device;
    detecting, using the computing device, whether the network identifier is based on a media item; and
    generating, using the computing device, a user interface comprising information related to the media item.

15. The method of claim 14, wherein detecting whether the network identifier is based on the media item comprises determining whether a portion of the network identifier matches a predetermined type code.

16. The method of claim 14, further comprising associating, using the computing device, the network identifier with a list of a plurality of additional network identifiers that are based on a plurality of additional media items, wherein the user interface comprises the list.

17. The method of claim 14, further comprising decoding, using the computing device, the network identifier according to a key.

18. The method of claim 17, further comprising obtaining, using the computing device, the key from a network identifier encoding coordinator.

19. The method of claim 14, further comprising obtaining, using the computing device, a copy of at least a portion of the media item via a network associated with the network identifier.

20. The method of claim 14, further comprising obtaining, using the computing device, a network page comprising information regarding the media item via a network associated with the network identifier.

* * * * *